Figure 1:
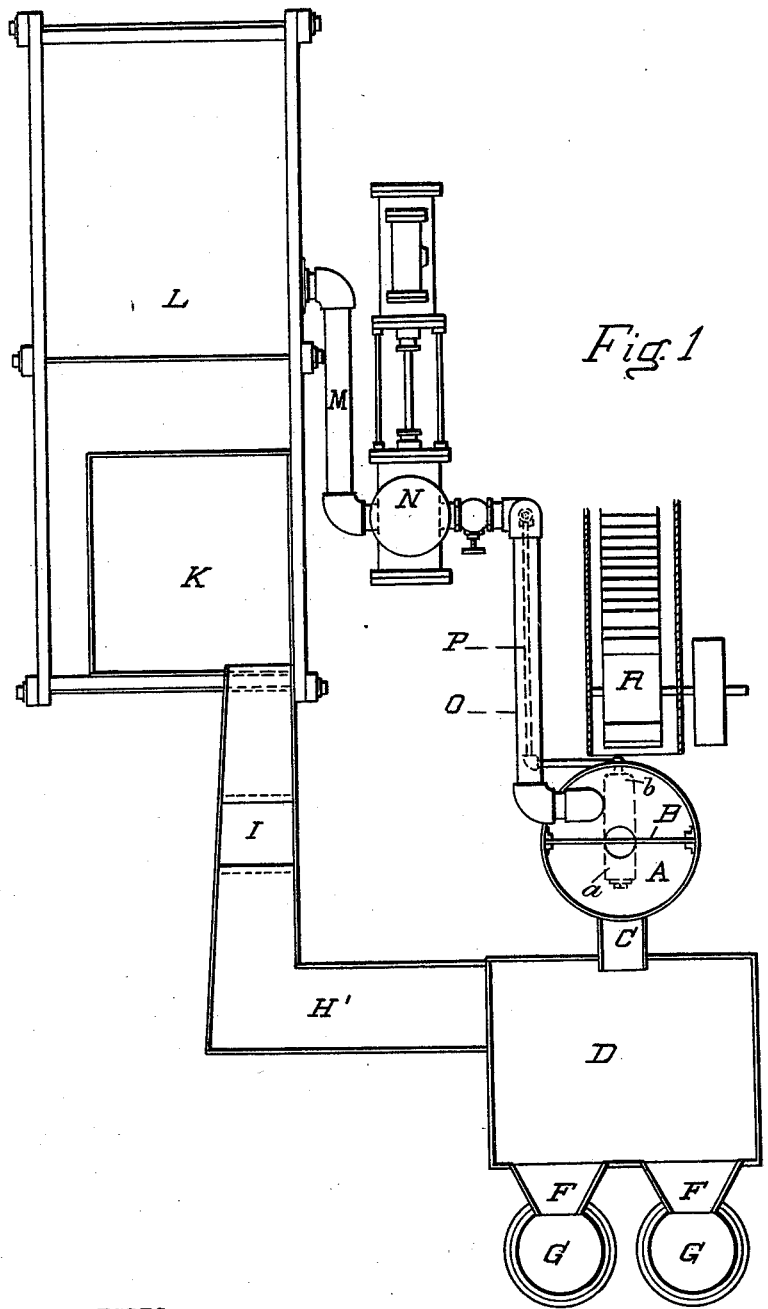

(No Model.)　　　　　　　　　　　　　　　　2 Sheets—Sheet 1.
N. C. MITCHELL.
APPARATUS FOR WASHING AND SEPARATING RUBBER.

No. 408,424.　　　　　　　　　　Patented Aug. 6, 1889.

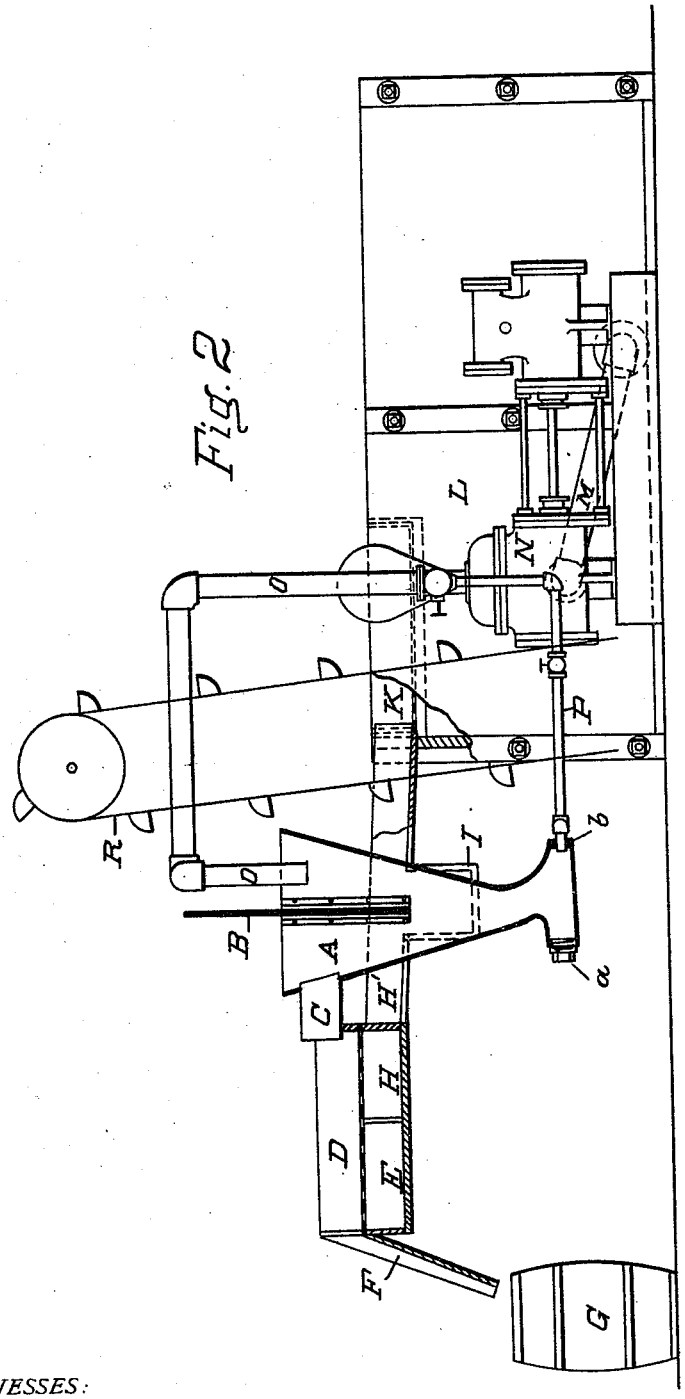

UNITED STATES PATENT OFFICE.

NATHANIEL CHAPMAN MITCHELL, OF PHILADELPHIA, PENNSYLVANIA.

APPARATUS FOR WASHING AND SEPARATING RUBBER.

SPECIFICATION forming part of Letters Patent No. 408,424, dated August 6, 1889.

Application filed June 19, 1889. Serial No. 314,802. (No model.)

*To all whom it may concern:*

Be it known that I, NATHANIEL CHAPMAN MITCHELL, of Philadelphia, in the county of Philadelphia and State of Pennsylvania, have invented a new and useful Improvement in Apparatus for Washing and Separating Rubber, which improvement is fully set forth in the following specification.

This invention relates to machinery or apparatus for treating rubber waste for the removal therefrom of mineral and other foreign matters.

In carrying out the invention the rubber waste, after being reduced to small pieces in any suitable way, as by chopping or grinding, is fed in regulated quantities into a separator, through which a current of water is kept in constant circulation. The separation is effected in consequence of the difference in specific gravity of the rubber and the metal or other foreign substances, which sink to the bottom of the separator, while a properly-directed stream of water carries the rubber over the edge thereof into a receiver arranged to catch it.

The action of the apparatus is made continuous, the feeding devices being in constant operation and the circulation of the water being maintained by a suitable pump. Suitable devices for catching sand, for draining off water from the rubber, and for other purposes important in the practical working of the invention are included in the system, as hereinafter more fully set forth.

Referring to the accompanying drawings, Figure 1 is a plan view of an apparatus constructed in accordance with the invention; and Fig. 2, a side elevation thereof, partly in section.

The separator A is a vessel of iron or copper tapering in cross-section toward the bottom and provided with a vertical diaphragm B, extending across the center thereof. As shown in Fig. 2, the diaphragm B terminates some distance from the bottom of vessel A.

*o* is a water-pipe discharging into the top of vessel A and communicating with a steam-pump N, of ordinary construction, which pumps water from a tank or reservoir L by pipe M. P is a smaller pipe, also communicating with pump N and discharging into the bottom of vessel A at *b*.

R is an elevator of ordinary construction, provided with buckets for feeding the rubber scrap into the separator.

C is an overflow-pipe for delivering the rubber onto a screen D of fine wire mesh. Screen D extends over the overflow-trough H and over a water-basin E, and at its end are chutes F for discharging the rubber into receptacles G. The trough H communicates with the return-passage H', whereby the water is returned to the tank or reservoir L.

I is a sand-trap arranged in said return-passage, and is designed to catch any fine particles that may pass with the water through screen D. K is another screen for finally filtering the water, which is reused again and again. The number, construction, and location of these straining or filtering devices are capable of infinite variation.

At the bottom of separator A is a small screw-plug *a*, which can be removed from time to time to clear the separator of particles of metal and other foreign or refuse matters that may collect therein.

The operation of the apparatus is as follows: Rubber reduced to a state of proper fineness is fed into separator A from the elevator-buckets and strikes against the diaphragm B, the separator being full of water to and a little above the level of the overflow of pipe C. The current from pipe D carries the material treated downward until it passes the diaphragm, when the lighter particles of rubber rise on the other side of the diaphragm, being assisted in this movement by the stream of water from the small pipe P. The heavier foreign particles—such as bits of metal and the like—sink to the bottom of the separator. The overflow of water carries the rubber onto screen D, where the water is drained off into trough H. It is further drained on that part of screen D which overlies the basin E, and is finally discharged by chutes F into suitable receptacles G. Automatic means may be used, if desired, to feed the washed rubber off the screen D. The fine particles of dirt and sand that pass with the water through screen D are in great measure arrested at the sand-trap I in return-passage H'. Reservoir L is of such size that the water therein is practically in a state of rest, and the impurities which are not already removed have sufficient time to settle.

The above description sets forth what is regarded as the best embodiment of the principle of my invention, being the form in which it is applied and now in practical operation; but it will be obvious to persons skilled in the art to which this invention relates that the same may be practically carried out in various ways, and that the details of construction and the arrangement of the different parts may be modified within wide limits without departing from the spirit of the invention.

What I claim is—

1. The combination, with the separator having a diaphragm partially dividing the same, of a rubber-feeding device and water-supply pipe on one side of said diaphragm and an overflow-pipe on the other side thereof, substantially as described.

2. The combination, with the separator having a diaphragm extending part way down the same, of rubber-feeding devices and a main water-pipe on one side of said diaphragm, an overflow-pipe on the other side of said diaphragm, and a smaller water-pipe discharging into said separator below the diaphragm and at the side opposite said overflow-pipe, substantially as described.

3. In a rubber-cleansing apparatus, the combination of the separator, the rubber-feeding device, the water-pipe discharging into said separator, the overflow-pipe for the rubber, the return water-passage, and the pump for maintaining a constant circulation of water through the separator, substantially as described.

4. The combination, with the separator, feeding device, and water-supply pipe, of the overflow-pipe, a screen for receiving the matters discharged by said pipe, and the return water-passage under said screen, substantially as described.

5. The combination of the separator, the water-supply pipe therefor, the reservoir, the pump, the overflow-pipe from the separator, the screen onto which said overflow discharges, and the return-passage leading from beneath said screen to said reservoir, said return-passage being provided with means for purifying the water, substantially as described.

6. In a rubber-cleansing apparatus, the combination, with rubber-feeding mechanism and a water-supply, of a separator consisting of a vessel tapering from the top downward, a vertical diaphragm extending across said vessel and terminating some distance from the bottom thereof, said vessel having an overflow-opening on the side of said diaphragm opposite to the feeding mechanism, a main water-pipe discharging downward on the same side as the feeding mechanism, and a small water-pipe discharging into said vessel near the bottom thereof and in the direction of the overflow, substantially as described.

In testimony whereof I have signed this specification in the presence of two subscribing witnesses.

NATHANIEL CHAPMAN MITCHELL.

Witnesses:
EDWARD M. MUNDY,
JOEL H. LEEDS.